United States Patent

Hendrickson et al.

Patent Number: 5,885,517
Date of Patent: Mar. 23, 1999

[54] METHOD OF MAKING A PLASTIC CONTAINER HAVING AN INJECTION MOLDED FINISH WITH AN INTEGRAL CLOSURE ATTACHED THERETO

[75] Inventors: Ralph B. Hendrickson, Temoerance, Mich.; Carl E. Koeniger, Toledo, Ohio

[73] Assignee: Owens-Brockway Plastic Products Inc., Toledo, Ohio

[21] Appl. No.: 777,990

[22] Filed: Dec. 24, 1996

Related U.S. Application Data

[62] Division of Ser. No. 400,736, Mar. 8, 1995, Pat. No. 5,601,214.

[51] Int. Cl.⁶ .............................. B29C 49/04; B29C 49/06
[52] U.S. Cl. ............................................ 264/539; 264/536
[58] Field of Search ..................................... 264/539, 536; 215/211, 235, 237

[56] References Cited

U.S. PATENT DOCUMENTS

| | | | |
|---|---|---|---|
| 2,710,987 | 6/1955 | Sherman | 18/5 |
| 2,778,533 | 1/1957 | Savary | 222/92 |
| 2,911,673 | 11/1959 | Soubier | 18/5 |
| 2,936,481 | 3/1960 | Wilkalis et al. | 18/5 |
| 3,033,271 | 1/1962 | McGhie . | |
| 3,086,249 | 4/1963 | Nelson et al. | 264/537 X |
| 3,115,682 | 12/1963 | Soubier et al. | 264/539 X |
| 3,398,427 | 8/1968 | John | 425/525 X |
| 4,310,105 | 1/1982 | Gach . | |
| 4,371,095 | 2/1983 | Montgomery et al. | 215/211 |
| 4,917,253 | 4/1990 | Dutt | 215/235 |
| 5,008,066 | 4/1991 | Mueller | 264/537 |
| 5,031,784 | 7/1991 | Wright | 215/211 |
| 5,213,860 | 5/1993 | Laing . | |
| 5,238,157 | 8/1993 | Gentile . | |
| 5,437,383 | 8/1995 | Stull | 215/235 |
| 5,489,035 | 2/1996 | Fuchs | 215/235 |

FOREIGN PATENT DOCUMENTS

| | | |
|---|---|---|
| 1965761 | 7/1970 | Germany . |
| 3516890 | 11/1986 | Germany . |
| 92/00228 | 1/1992 | WIPO . |

Primary Examiner—Jan H. Silbaugh

[57] ABSTRACT

The plastic container and body including a body portion, a neck defining a finish and having an opening therein and a closure connected to the end of the neck by a strap. The strap is formed with a weakened line such as to define a integral hinge about which the closure is folded after filling the container with the contents in order to bring a plug portion of the closure into engagement with the opening of the finish.

10 Claims, 4 Drawing Sheets

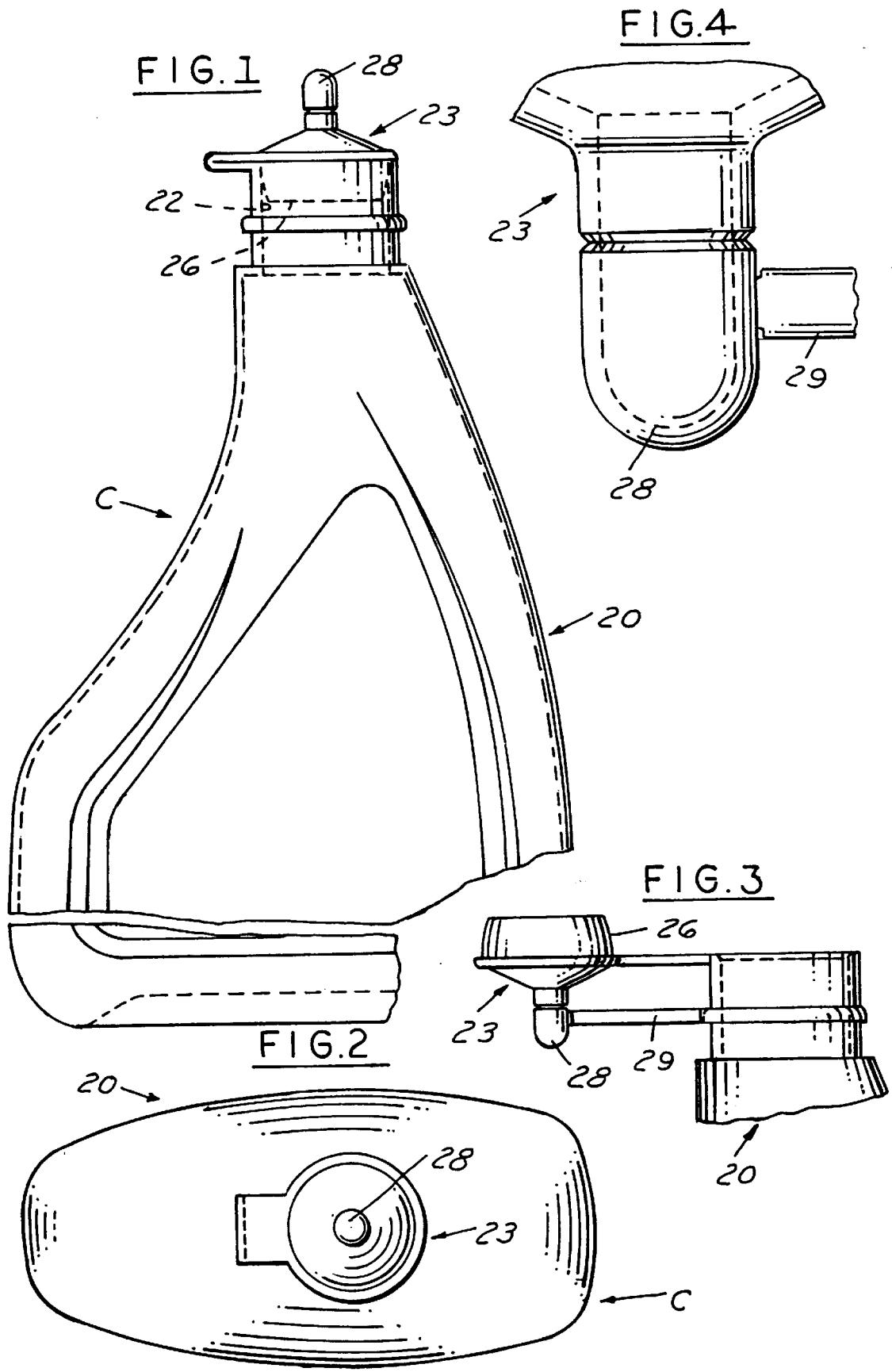

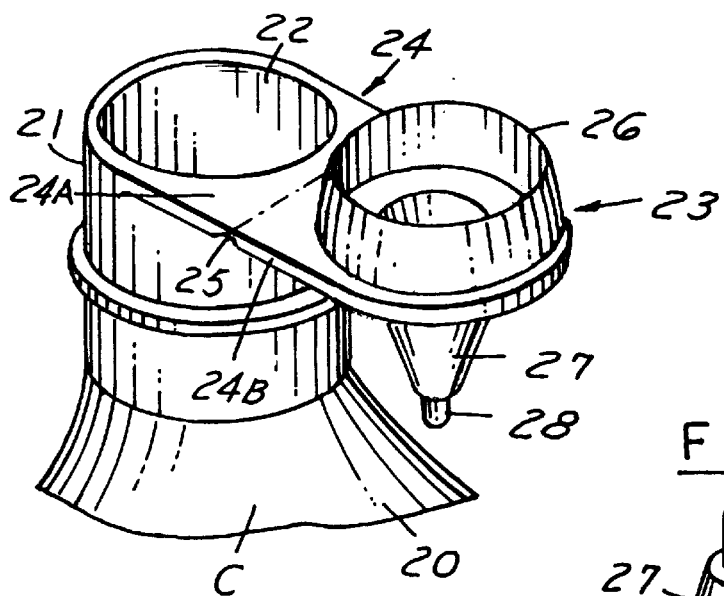
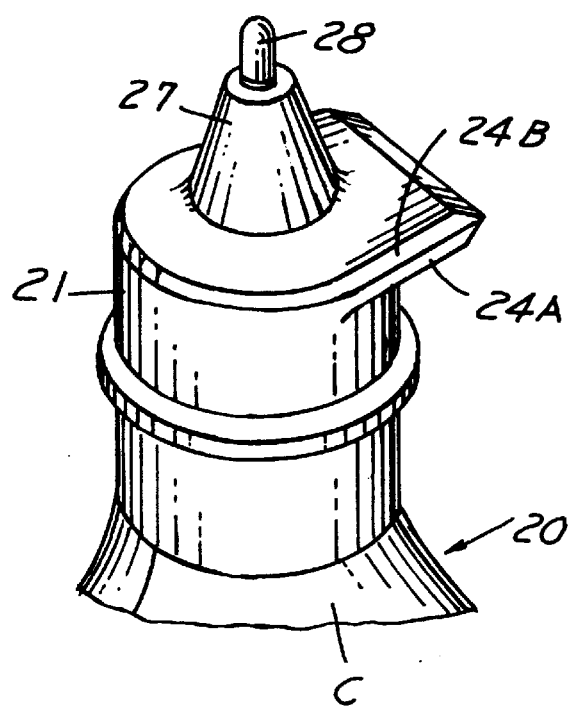
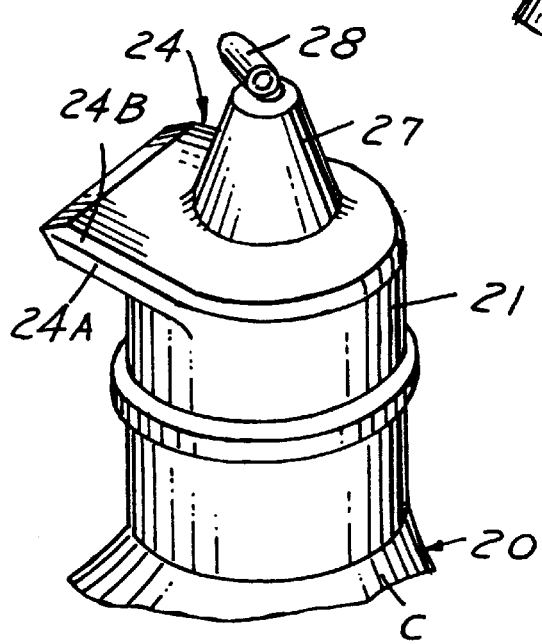

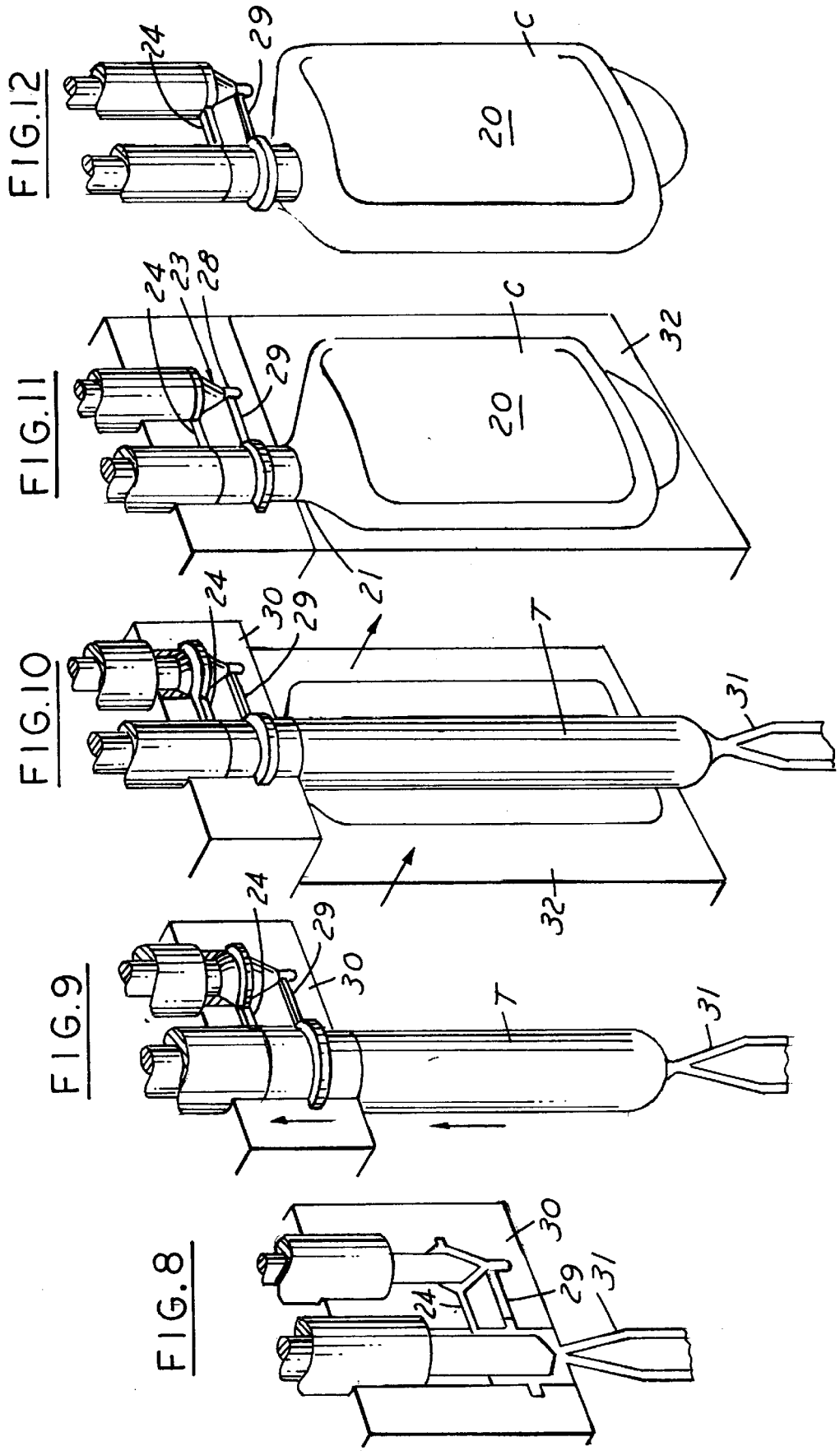

METHOD OF MAKING A PLASTIC CONTAINER HAVING AN INJECTION MOLDED FINISH WITH AN INTEGRAL CLOSURE ATTACHED THERETO

This is a divisional of application Ser. No. 08/400,736, filed on Mar. 8, 1995, now U.S. Pat. No. 5,601,214.

This invention relates to plastic containers and plastic containers which have an integral closure attached thereto.

BACKGROUND AND SUMMARY OF THE INVENTION

In one type of plastic container it is common to make the plastic container by injection molding a finish, extruding an integral plastic tube attached to the finish, closing molds about the container and blowing the container to the confines of the mold to form the container. Such a method is shown, for example, in U.S. Pat. Nos. 2,710,987, and 2,911,673 and 2,936,481.

In such a container, if a closure is to be applied it is necessary for special closure tooling to be used; have a bottle and closure inventory; and require the customer to handle separate parts. In addition, where the closure and container are made of separate plastics, the closures and containers may need to be separated in order to recycle the plastic.

It has heretofore been suggested to provide an integral closure such as in U.S. Pat. Nos. 3,086,249, 3,115,682 and 5,008,006.

Among the objectives of the present invention are to provide a plastic container having an injected finish and closure with an extruded and blown body portion; wherein the closure is connected to the finish of the container by a hinge strap; wherein the closure includes a plug portion such that when the strap is folded about the hinge, which is formed integrally, the plug portion of the closure is centered over and can be readily pressed into the finish for sealing.

In accordance with the invention, the plastic container and body includes a body portion, a neck defining a finish and having an opening therein and a closure connected to the end of the neck by a strap. The strap is formed with a weakened line such as to define an integral hinge about which the closure is folded after filling the container with the contents in order to bring a plug portion on the closure into engagement with the opening of the finish.

DESCRIPTION OF THE DRAWINGS

FIG. 1 is a fragmentary elevational view of a container and closure embodying the invention.

FIG. 2 is a plan view of the same.

FIG. 3 is a fragmentary elevational view showing the upper end of the container and closure as molded.

FIG. 4 is fragmentary enlarged view of a portion of the closure as molded.

FIG. 5 is a fragmentary perspective view of the upper end of the container and closure after molding and trimming.

FIG. 6 is a fragmentary perspective view showing the upper end of the container and closure, when the closure is in sealing position.

FIG. 7 is a fragmentary perspective view showing how the end of the closure can be severed to provide a dispensing opening.

FIGS. 8–12 are fragmentary schismatic views showing the manner in which the closure is made during successive steps of making.

DESCRIPTION OF THE PREFERRED EMBODIMENTS

Figure 13:
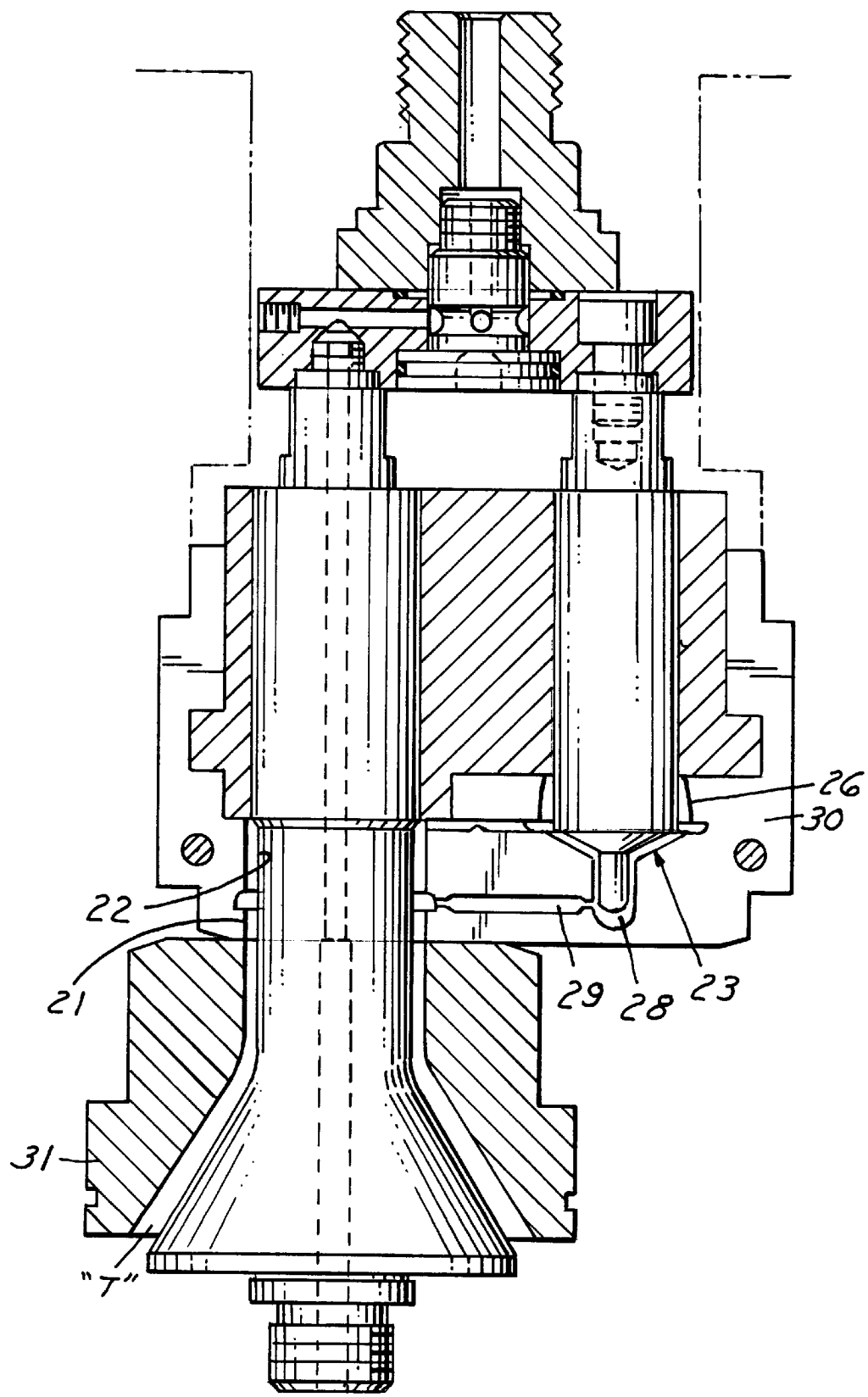
FIG. 13 is a fragmentary sectional view of a portion of an apparatus for making the closure.

Referring to FIGS. 1–7 the plastic container embodying the invention comprises a hollow body 20, formed with a neck 21, defining a finish having an opening 22 to which a closure 23 is connected by an integral strap 24. The strap 24 includes a groove 25 (FIG. 5) which defines an integral hinge separating the strap into a first portion 24A connected to the upper end of the finish 21 and a second portion 24B connected to the closure 23. The closure includes a plug portion 26 that is adapted to enter the opening 22 of the finish. The closure 23 further includes a dispensing spout 27 that is closed by small integrally molded tubular plug 28 that has a closed end. A groove defines the juncture between the spout 27 and the plug 28.

When the container is filled, the closure is folded about the weakened line 25 bringing the plug 26 into centered registry with the opening 22 so that the strap 24 can be folded and the closure forced downwardly, by machinery or by hand, to bring the portions 24A, 24B of the strap into engagement (FIG. 7) in this position. When it is desired to dispense the contents, the closed projection 28 can be severed by an instrument or by hand leaving an opening for dispensing the contents.

The container is preferably made by a process known as an injection, extrude and blow process that is commonly known as the BC-3 process, such as shown in the aforementioned U.S. Pat. Nos. 2,710,987, 2,911,673 and 2,936,481, incorporated herein by reference.

In such an arrangement, as shown in FIGS. 8–13, neck ring halves 30 are brought together adjacent an extruder 31 to injection mold the molten plastic into the neck, closure, and integral strap cavity formed by closing of the neck rings. The neck rings 30 are then moved axially relatively to the extruder 31 to extrude a tube T. Blow molds 32 are then closed about the tube while the neck rings 30 are closed and air is introduced through the neck to blow the hollow body C forming the container 20. During this molding process, a second strap or runner 29 is formed that extends from the finish 21 at a point axially spaced from the upper open end of the finish to the closure 23 and in the instance shown to the integral cap 28 (FIG. 3). The provision of the auxiliary strap 29 aids in filling of the closure cavity 23 during the injection portion of the process. This closure strap 29 also stabilizes the position of the closure 23 during the filling of the container after which the strap 29 can be trimmed from the container leaving the closure in position for folding and closing of the opening of the finish.

It can thus be seen that there has been provided a plastic container having an injected finish and closure with an extruded and blown body portion; wherein the closure is connected to the finish of the container by hinge strap; wherein the closure includes a plug portion such that when the strap is folded about the hinge, that is formed integrally, the closure is centered over and can be readily pressed into the finish for sealing.

What is claimed is:

1. A method of making a plastic container with integral closure that comprises the steps of:

(a) injection molding a container finish with an opening and an integral closure connected to an upper end of the finish by a connecting strap, said closure having a plug portion sized for receipt into the finish opening, a spout integrally extending from said plug portion and an integrally molded severable sealing plug on said spout, (b) during said step (a), forming a weakened line laterally across said connecting strap to provide an inherent hinge line in said strap so positioned on said strap with respect to the integral finish and closure that folding of the strap along said weakened line brings the plug portion of the closure into alignment for sealing engagement with the opening in the finish, (c) integrally extruding a tube from said finish, (d) closing blow molds around the tube, and (e) blowing the tube to the confines of the blow mold to form a hollow is container integral with said finish.

2. The method set forth in claim 1 including forming a groove defining the juncture of said spout and plug.

3. The method set forth in claim 2 including the additional step of: (f) injection molding a second connecting strap between the sealing plug and the finish which functions to aid in filling of the closure mold cavity during said steps (a) and (b), and to stabilize the closure during filling of the container with product, and which can be trimmed from the finish and closure after filling of the container to permit the folding of the strap and the sealing of the closure.

4. The method set forth in claim 3 comprising the additional step of: (g) trimming said second connecting strap from the integral container and closure.

5. A method of making a plastic container with integral closure that comprises the steps of:

(a) injection molding a container finish with an opening and an integral closure connected to an upper end of the finish by a connecting strap, said closure having a plug portion sized for receipt into the finish opening, (b) during said step (a), forming a weakened line laterally across said connecting strap to provide an inherent hinge line in said strap so positioned on said strap with respect to the integral finish and closure that folding of the strap along said weakened line brings the plug portion of the closure into alignment for sealing engagement with the opening in the finish, (c) integrally extruding a tube from said finish, (d) closing blow molds around the tube, (e) blowing the tube to the confines of the blow mold to form a hollow container integral with said finish, (f) injection molding a second connecting strap between the closure and the finish which functions to aid in filling of the closure mold cavity during said steps (a) and (b), and to stabilize the closure during filling of the container with product, and which can be trimmed from the finish and closure after filling of the container to permit the folding of the strap and the sealing of the closure, and (g) trimming said second connector strap from the integral container and closure.

6. The method set forth in claim 5 wherein said step of injection molding said strap comprises forming said strap in a single plane integral with said finish at the upper end of said finish.

7. The method set forth in claim 6 wherein said step of forming a weakened line comprises injection molding a groove into said strap to form said line dividing the strap into two flat strap portions, one of the strap portions being integral with the finish and the other strap portion being integral with the closure.

8. The method set forth in claim 7 wherein the step of molding said groove comprises forming said groove on a side of said strap remote from the plug portion and the finish opening.

9. The method set forth in claim 8 wherein said step (a) comprises forming the second strap lying in a plane parallel to the plane of said first-mentioned strap extending from the closure to the finish.

10. The method set forth in any one of claims 5 and 6–9 including forming a spout extending from said plug portion, said spout having an integrally molded sealing plug that is severable.

* * * * *